United States Patent [19]

Yoshida

[11] Patent Number: 5,541,984
[45] Date of Patent: Jul. 30, 1996

[54] COMMUNICATION CONTROL APPARATUS

[75] Inventor: Takehiro Yoshida, Tokyo, Japan

[73] Assignee: Canon Kabushiki Kaisha, Tokyo, Japan

[21] Appl. No.: 163,070

[22] Filed: Dec. 6, 1993

[30] Foreign Application Priority Data

Dec. 14, 1992 [JP] Japan .................. 4-332753

[51] Int. Cl.⁶ .................. H04M 11/00; H04M 1/00
[52] U.S. Cl. .................. 379/100; 379/354; 379/355
[58] Field of Search .................. 379/354, 355, 379/356, 100, 93, 96, 97, 98; 358/400, 434, 435, 436, 437, 438, 439, 440, 468

[56] References Cited

U.S. PATENT DOCUMENTS 3,925,622 12/1975 Robinson .................. 379/355
4,910,506 3/1990 Yoshida et al. .................. 379/100
4,939,767 7/1990 Saito et al. .................. 379/100
4,956,860 9/1990 Murata .................. 379/100
5,057,941 10/1991 Moriya .................. 379/100
5,125,025 6/1992 Lim .................. 379/100
5,189,696 2/1993 Yoshida .................. 379/100
5,280,519 1/1994 Nakajima et al. .................. 379/100
5,325,425 1/1994 Novas et al. .................. 379/100
5,384,836 1/1995 Otsuka .................. 379/100

FOREIGN PATENT DOCUMENTS 63-316545 12/1988 Japan .................. 379/100
64-89855 4/1989 Japan .................. 379/100

*Primary Examiner*—Jason Chan
*Attorney, Agent, or Firm*—Morgan & Finnegan, L.L.P.

[57] ABSTRACT

A communication apparatus for performing automatic-calling to a designated party. In a call-connecting sequence started by automatic-calling, if a predetermined call-prohibition signal requiring prohibition of calling is detected, calling to the receiving party thereafter is prohibited.

9 Claims, 17 Drawing Sheets

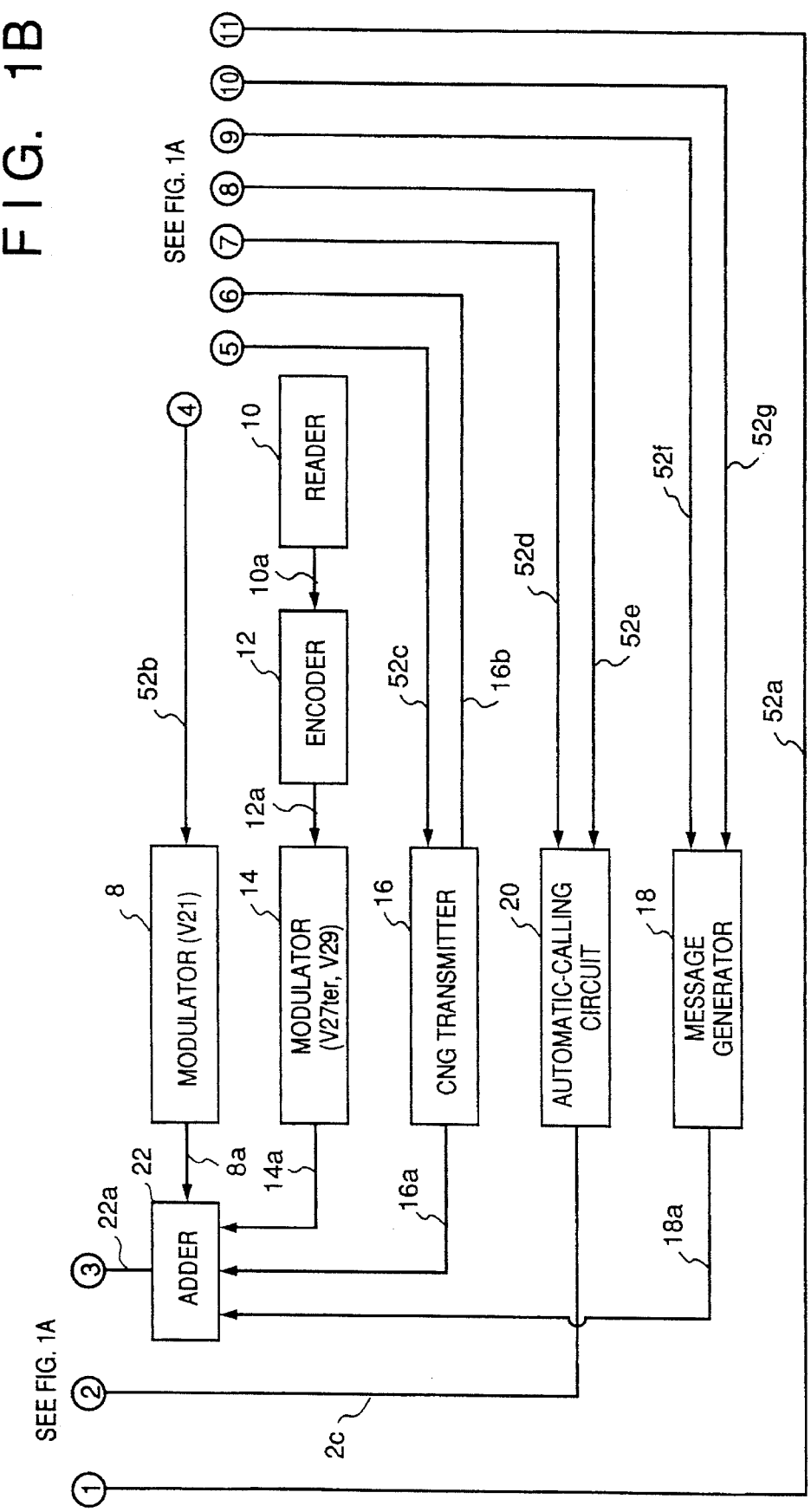

FIG. 2

| SINGLE-TOUCH KEY /ABBREVIATED DIALING NUMBER | TELEPHONE NUMBER | TENTATIVE DETERMINATION FLAG | FINAL DETERMINATION FLAG | CALL PROHIBITION FLAG | RECEPTION NEGATION FLAG |
|---|---|---|---|---|---|
| 01 | 03-3123-3214 | 0 | 0 | 0 | 0 |
| 02 | | 1 | 1 | 0 | 0 |
| ～ | | | | | |
| *01 | | 1 | 0 | 1 | 1 |
| *02 | | 0 | 0 | 0 | 0 |
| ～ | | | | | 0 |

FIG. 3

| SINGLE-TOUCH KEY DIALING NUMBER | TELEPHONE NUMBER | TELEPHONE | CALL-PROHIBITION |
|---|---|---|---|
| 01 | 03-3123-3214 | | |
| 02 | | ★ | |
| 03 | | | |
| ⋮ | | | |
| 24 | | | |
| ABBREVIATED DIALING NUMBER | | | |
| *01 | | | |
| *02 | | | ★ |
| ⋮ | | | |
| *99 | | | |

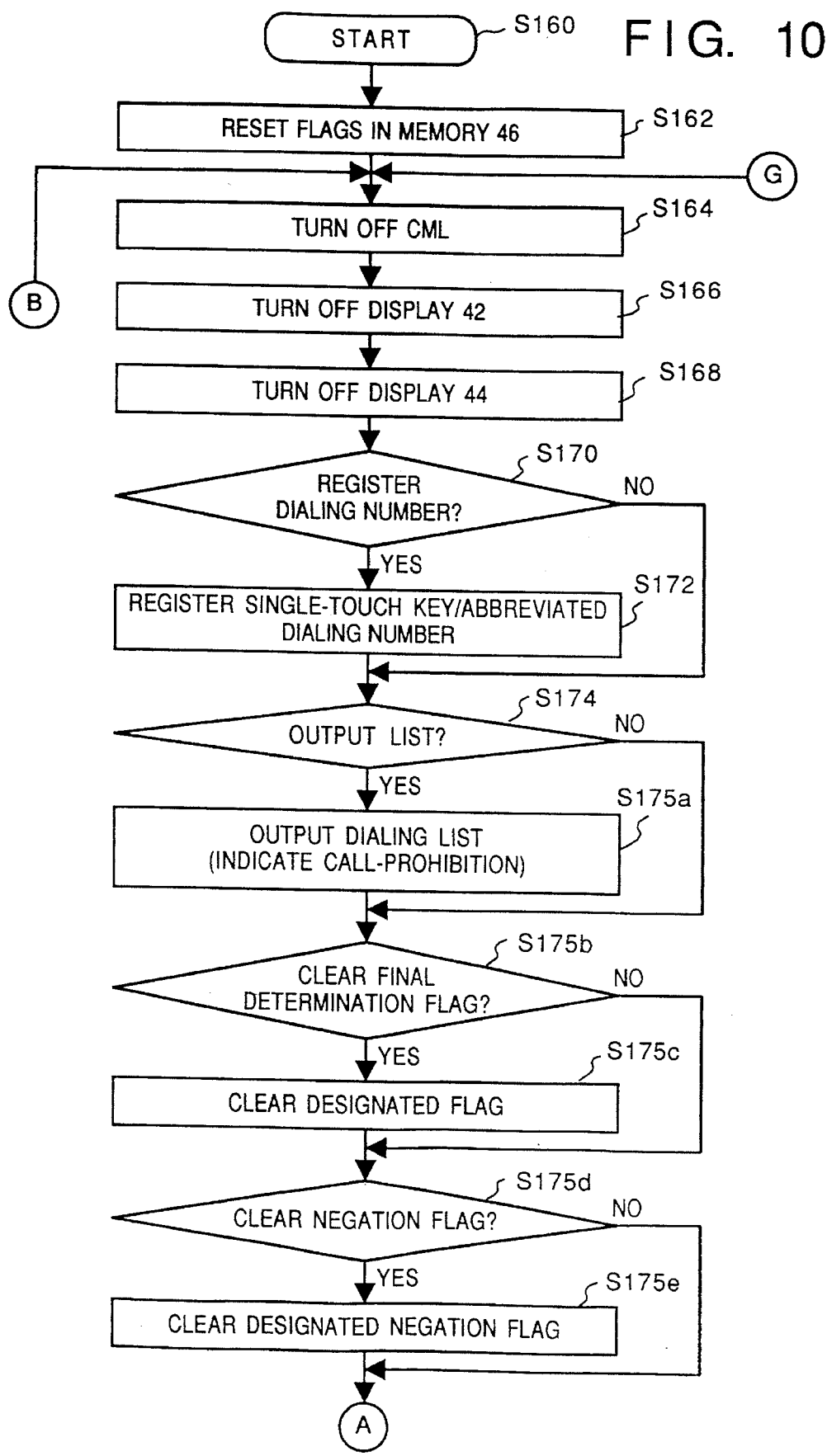

COMMUNICATION CONTROL APPARATUS

BACKGROUND OF THE INVENTION

Present invention relates to a communication apparatus having an automatic-calling function and a control method for such apparatus.

In conventional facsimile apparatuses, upon selection of single-touch key dialing or abbreviated dialing, they read an original for transmission, and then make an automatic call. The transmitter apparatus also executes automatic redialing after a predetermined time period of the first dialing. The redialing process is not made for the case that a transmission error is detected after detecting a significant signal from the called party and the case that the communication has been normally performed.

Generally, the preset number of redials is two. In many cases, time interval between redialings is shorter than the waiting time during which the called party is busy. For this reason, the setting of the number of redialings is usually left to the operator.

In an apparatus with such an automatic-calling function, in a case where a registered dial number is wrong (e.g., the dial number of a telephone which has no facsimile function has been registered), a call to this number will always fail. Furthermore, subsequent automatic redialings will annoy the called party. Especially, if the redialings are made many times, and/or the call is made at night, the called party will suffer terrible nuisance. To make matters worse, as the called party cannot trace the call originator, from only the communication tone (e.g. a CNG), the called party cannot stop the redialing.

Japanese Patent Application Laid-Open No. 1-89855 has introduced a facsimile apparatus having an automatic-calling function in view of the above problem. The apparatus detects a CED and a HDLC frame from a called party and determines whether or not the called party is a facsimile apparatus based on the detection result. If the called party is not a facsimile apparatus, the apparatus transmits an audible message to the called party and quits redialing.

SUMMARY OF THE INVENTION

The present invention has been made in consideration of the above situation, and it provides a communication apparatus which avoids erroneous calling and a control method for the apparatus.

Another object of the present invention is to provide a communication apparatus which detects a call-prohibition signal from a called communication apparatus and a control method for such apparatus.

A further object of the present invention is to provide a communication apparatus which does not redial to a called party when receiving a call-prohibition signal sent from the called party and a control method for such apparatus.

Yet another object of the present invention is to provide a communication apparatus which stores information of a called party when receiving a call-prohibition signal from the called party and which does not redial to the called party thereafter, and a control method for such apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B are block diagrams showing the configuration of a facsimile apparatus according to first to fourth embodiments of the present invention;

FIG. 2 is a block diagram showing data structure in dial information memory 46;

FIG. 3 illustrates an example of a dialing number list;

FIGS. 10 to 13 are flowcharts showing a control procedure according to a fourth embodiment;

DETAILED DESCRIPTION OF THE PREFERRED EMBODIMENTS

Preferred embodiments of the present invention applied to a facsimile apparatus will be described in detail in accordance with the accompanying drawings.

Construction of Facsimile Apparatus

Figure 1A:
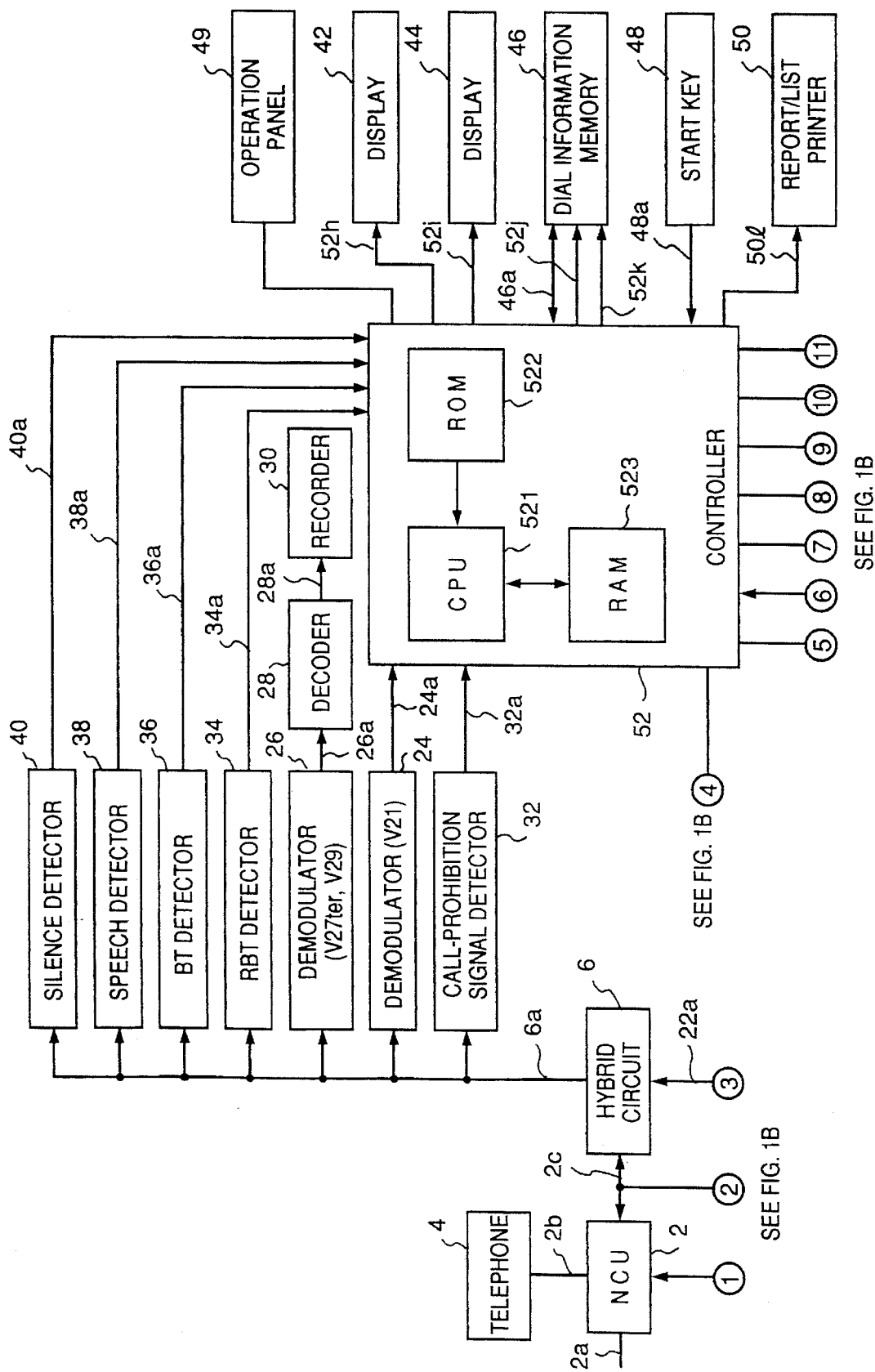

FIGS. 1A and 1B show the configuration of the facsimile apparatus.

In FIGS. 1A and 1B, reference numeral 2 denotes a network control unit (NCU). To use a telephone network for data communication, the NCU 2 connects the facsimile apparatus to terminals on a network line, switches data communication paths, and maintains a loop. Numeral 2a denotes a telephone line; and 4, a telephone. The NCU 2 inputs a signal from signal line 52a, and if the signal level is "0" the NCU 2 connects the telephone line 2a to signal line 2b on the telephone 4 side. On the other hand, if the signal level is "1", the NCU 2 connects the telephone line 2a to signal line 2c on the facsimile apparatus side. In an idling state, the telephone line 2a is connected to line 2b on the telephone 4 side.

Hybrid circuit 6 discriminates a transmission signal and a reception signal. More specifically, a transmission signal from signal line 22a is transferred through the signal line 2c and via the NCU 2 to the telephone line 2a. A signal from a called party is transferred via the NCU 2 and through the signal line 2c and outputted through the hybrid circuit 6 onto signal line 6a.

Modulator 8 (FIG. 1B) modulates a protocol signal from signal line 52b based on the CCITT Recommendation V21, and outputs modulated data to signal line 8a.

Reader 10 (FIG. 1B) sequentially reads one line of an image signal in a main-scanning direction from a transmission original and generates a series of signals representing black-and-white binary data. The reader 10 comprises an image sensing device such as a CCD (charge coupled device) and an optical system. The black-and-white binary data is outputted onto signal line 10a. Encoder 12 inputs the read data on the signal line 10a, performs MH (modified Huffman) coding or MR (modified READ) coding, and outputs the encoded data onto signal line 12a. Modulator 14 modulates based on the CCITT Recommendation V27 ter (differential phase modulation) or the Recommendation V29 (orthogonal modulation). The modulator 14 inputs the signal from the signal line 12a, modulates, and outputs the modulated data onto signal line 14a.

When a pulse instructing a CNG transmission appears on signal line 52c, CNG transmitter 16 transmits a CNG onto signal line 16a, and when the CNG transmission is over, generates a pulse signaling the completion of the CNG transmission on the signal line 16a. It should be noted that CNG is a calling signal transmitted from a call-originating facsimile apparatus to a receiving apparatus.

When a pulse instructing a message generation from controller 52 appears on signal line 52g, message generator 18 generates an audible message using speech information outputted on signal line 52f and outputs the message onto signal line 18a. When a pulse instructing a call appears on signal line 52e, automatic-calling circuit 20 inputs dial information outputted on signal line 52d and outputs a selection signal onto the signal line 2c. Adder 22 inputs signals from the signal lines 8a, 16a and 18a to add the signals, and outputs the result onto signal line 22a.

Demodulator 24 demodulates based on the CCITT Recommendation V21. The demodulator 24 inputs the signal on the signal line 6a, performs the V21 demodulation, and outputs the demodulated data onto signal line 24a. Demodulator 26 demodulates based on the CCITT Recommendation V27 ter (differential phase modulation) or the Recommendation V29 (orthogonal modulation). The demodulator 26 inputs the signal on the signal line 6a to demodulate, and outputs the demodulated data onto signal line 26a. Decoder 28 inputs the signal outputted on the signal line 26a, performs MH decoding or MR decoding, and outputs the decoded data onto signal line 28a. Recorder 30 inputs the data outputted on the signal line 28a and performs recording on a recording medium by one line.

Call-prohibition signal detector 32 inputs the signal on the signal line 6a, and if it detects a call-prohibition signal, generates a pulse indicative of detection of call-prohibition signal on signal line 32a.

RBT (ring-back tone) detector 34 outputs a "1" onto signal line 34a when it detects RBT, while it outputs a "0" onto the signal line 34a when it does not detect RBT. BT (busy tone) detector 36 inputs the signal on the signal line 6a and outputs a "1" onto signal line 38a when it detects BT, while it outputs a "0" onto the signal line 38a when it does not detect BT.

Speech detector 38 inputs the signal on the signal line 6a and outputs a "1" onto signal line 38a when it detects a speech signal, while it outputs a "0" onto the signal line 38a when it does not detect a speech signal. Silence detector 40 inputs the signal on the signal line 6a and outputs a "1" onto signal line 40a when it detects silence, while it outputs a "0" onto the signal line 40a when it does not detect silence.

Hereinafter, an apparatus which is not capable of facsimile communication will be referred to as "telephone" to distinguish such apparatus from a facsimile apparatus.

Display 42 displays a message "CALLED PARTY IS A TELEPHONE". More specifically, the display 42 inputs the single-touch key dialing number (or an abbreviated dialing number) of the called party and a telephone number of the called party, and informs the operator that the called party of the automatic-calling is a telephone by displaying the message and the telephone number of the called party.

During automatic-calling, if a call-prohibition signal is received from the called party, the information is displayed on display 44. More specifically, the display 44 reads the single-touch key dialing number (or an abbreviated number) of the called party and the telephone number of the party via signal line 52i, and informs the operator of the reception of call-prohibition signal from the called party by displaying the numbers.

Dial information memory 46 comprises a read/write memory such as a RAM. The operation of the dial information memory 46 will be described with reference FIG. 2 showing the data structure of this memory. As shown in FIG. 2, a single-touch key dialing number (or an abbreviated dialing number) is stored in the dial information memory 46. Further, one of four kinds of flags is stored in correspondence to the stored dialing number. The four flags are shown in the following table.

TABLE

| i | Tentative determination-as-telephone flag (hereinafter, referred to as "tentative determination flag") | Indicate whether a called party was a telephone in a previous calling. 0: non-telephone 1: telephone |
|---|---|---|
| ii | Final determination-as-telephone flag (referred to as "final determination flag") | Is set after determining that a called party is a telephone. If the tentative determination flag is "1" and it is determined that the called party is a telephone in a current calling, it is set to 1: telephone, otherwise set to 0: non-telephone |
| iii | Calling-prohibition signal reception flag (referred to as "prohibition flag") | Indicate whether a call-prohibition signal from a called party has been received. 0: not received 1: received |
| iv | Reception negation flag (referred to as "negation flag") | Negate reception from a call-originating apparatus. |

Note that the negation flag will be described in the fifth embodiment.

In the embodiments, "01" to "24" are available as single-touch key dialing numbers, and "*00" to "*99" are available as abbreviated dialing numbers.

When registering a single-touch key dialing number in the dial information memory 46, the controller 52 sequentially outputs the single-touch key dialing number (one of "01" to "24", e.g., "01"), a space, a telephone number (e.g., "01-3123-1234"), then the tentative determination flag, the final determination flag, and the prohibition flag onto the signal line 46a, and generates a write pulse on signal line 52j. When registering an abbreviated dialing number, the controller performs the above operation except outputting the abbreviated dialing number (one of "*00" to "*99") instead of the single-touch key dialing number.

When reading data out of a single-touch dialing number area, the controller 52 outputs a corresponding single-touch dialing number (one of "01" to "24", e.g., "01" ) onto the signal line 46a, and generates a read pulse on signal line 52k. The dial information memory 46 outputs a telephone number registered in correspondence with the single-touch key dialing number (i.e., "03-3213-1234"), the tentative determination flag, the final determination flag, the prohibition flag and the negation flag onto the signal line 46a. When reading data registered at an abbreviated dialing number area, the controller 52 performs the above operation except outputting a corresponding abbreviated dialing number (one of "*00" to "*99") instead of the single-touch key dialing number. In a case where it is tentatively determined twice that the called party of automatic-calling is a telephone, it is finally determined that the called party is a telephone.

In FIG. 1A, when start key 48 is pressed, it generates a pulse on signal line 48a. Report/list printer 50 inputs data outputted on signal line 52l and records the data for making a single-touch key/abbreviated dialing number report/list.

The controller 52 mainly controls the automatic-calling in the controller 52, CPU 521 reads various control programs, including a program represented by a flowchart to be described later, out of ROM 522 and executes the programs. RAM 523 is a work area for the CPU 521. When the CPU 521 executes the various controls, it temporarily stores data in the RAM 523.

In FIG. 1A, operation panel 49 has various key switches such as "final determination flag clearing" key, "prohibition flag clearing" key, "negation mode setting" key and "negation flag clearing" key.

The facsimile apparatus having the above-described construction will be described below as the first to fifth embodiments.

First Embodiment

The facsimile apparatus according to the first embodiment has the following functions:

F1: Determining whether or not the called party is a telephone. Upon facsimile communication by an automatic-calling using a single-touch key dialing number or an abbreviated dialing number, if it is determined that the called party is a telephone, the tentative determination flag is set to "1".

F2: Terminating redialing in automatic-calling. The redialing is terminated regardless of a set number of redialing times when it is determined that the called party is a telephone. This prevents trouble caused by automatic redialings based on a registered wrong number. However, when automatic-calling is made again using the same single-touch dialing number or abbreviated dialing number, redialing is performed at least once.

F3: Displaying message "CALLED PARTY IS A TELEPHONE" on the display 42 when the called party of automatic-calling is a telephone, and/or printing-out a report/list including the notification. This informs the operator that the facsimile transmission cannot be performed and that the called party is a telephone.

F4: Final determination that a called party is a telephone. When automatic-calling is tried more than twice and it is tentatively determined that the called party is a telephone in those calling, it is finally determined that the called party is a telephone. The final determination flag is set to "1".

F5: Allowing the operator's selection of automatic facsimile transmission. Even if it has been finally determined that the called party is a telephone in a previous facsimile communication (i.e., the final determination flag is set to "1"), the operator can execute the automatic facsimile transmission. The operator must know the called party's condition from F3, however, the operator's judgment is given preference the device's judgment.

First, the description will be made on the function F1. The facsimile apparatus of the embodiment tentatively determines that a called party is a telephone if one of the following conditions is satisfied:

C-1: Upon calling, a detection of RBT is accompanied by a continuous silent state for longer than a predetermined time period.

C-2: Upon calling, a detection of RBT by a detection of speech signal within a predetermined time period.

C-3: Upon calling, a detection of RBT by a detection of busy tone signal within a predetermined time period.

Then the facsimile apparatus sets the tentative determination flag corresponding to the single-touch key dialing number or abbreviated dialing number to "1".

Regarding F4, when the facsimile apparatus successively determines that "CALLED PARTY IS A TELEPHONE" twice, i.e., if one of the conditions C-1 to C-3 is satisfied such that the tentative determination flag is set to "1", the apparatus finally determines that the called party is a telephone (i.e., "not a facsimile apparatus"), and sets the final determination flag corresponding to the single-touch key dialing number or abbreviated dialing number to "1".

If the tentative determination flag corresponding to the called party of automatic-calling is set to "1" and the same party is designated as a receiving apparatus, the transmitting apparatus displays message "CALLED PARTY IS A TELEPHONE" on the display 42. Then the apparatus prohibits subsequent redialing.

Upon calling, when a facsimile communication is established, or BT is detected within a predetermined time period after RBT, the facsimile apparatus clears the tentative determination flag corresponding to the called party regardless of the value of the flag.

Regarding F5, if the transmitting apparatus has finally determined that "CALLED PARTY IS A TELEPHONE" but the same party is again designated as a receiving apparatus, the apparatus prohibits the subsequent redialing and notifies the operator that the receiving apparatus is a telephone by the display 42. If the operator nevertheless presses the start key 48, the facsimile apparatus accepts the operator's request for automatic-calling, and performs automatic-calling to the receiving apparatus.

Regarding F3, when the apparatus finally determines that a called party is a "non-facsimile apparatus", but the same party is again designated as a receiving apparatus, the transmitting apparatus prints out a list indicating that the receiving apparatus is a telephone. FIG. 3 shows an example of the list where the receiving apparatus' number is marked with "★" indicating that this apparatus is a telephone.

It should be noted that the explanation of "call-prohibition" column in FIG. 3 will be made in the description of the fourth embodiment.

In the aforementioned functions, the message generator 18 and call-prohibition signal detector 32 are not employed in the control according to the first embodiment. These elements are used in the second embodiment and the subsequent embodiments, and will be described in the corresponding embodiments.

Hereinbelow, the control procedure by the controller 52 according to the first embodiment will be described with reference to flowcharts in FIGS. 4 to 7.

Steps S60 to S62 show initialization after the apparatus is switched on. In step S62, in the dial information memory 46, the three flags (tentative determination flag, final determination flag and prohibition flag) corresponding to each single-touch key dialing number or abbreviated dialing number are cleared.

The initialization in step S62 is made to prevent possibility of storing meaningless value in the dial information memory 46 by the switching on the apparatus. If the dial information memory 46 is backed up with a battery, the contents of the memory 46 are not deleted by shutting down the apparatus. In this case, step S62 can be omitted.

In step S64, a signal of level "0" is outputted onto the signal line 52a to turn a CML off, which changes the NCU 2 connection to the signal lines 2a–2b (to the telephone side). Note that the CML is a signal for switching over the line connection at the NCU 2 to the telephone or the facsimile apparatus. Here, when the CML is turned off, the line to the facsimile apparatus side is disconnected.

In step S66, notification on the display 42 is turned off. In step S68, notification on the display 44 is turned off.

In step S70, whether registration of a single-touch key dialing number or abbreviated dialing number is selected or not is determined. If YES, the process proceeds to step S72 in which the single-touch key dialing number or abbreviated dialing number is registered. If NO, the process proceeds to step S74.

In step S74, whether outputting of list of single-touch key dialing/abbreviated dialing numbers is selected or not is determined. If the operator selects outputting the list, the process proceeds to step S76 in which a single-touch key dialing/abbreviated dialing number list is outputted. In step S76, information stored in the dial information memory 46 is inputted to the report/list printer 50 and the single-touch key dialing/abbreviated dialing number list is outputted. As described above, the list has a "★" marked number if the corresponding receiving apparatus is a telephone (See FIG. 3). If NO in step S74, the process proceeds to step S78.

In step S77a, whether or not the operator has pressed the "final determination flag clearing key" is examined. If YES, the final determination flag, as shown in FIG. 2, designated by the operator is reset.

In step S78, whether the operator has selected automatic-calling using a single-touch key dialing number or abbreviated dialing number or not is determined. If NO, the process proceeds to step S80 in which other processings are performed, thereafter, returns to step S64. Steps S64 to S78→step S80→step S64 are repeated unless automatic-calling is selected.

If YES in step S78, the process proceeds to step S82 in which the contents of the dial information memory 46 (FIG. 2) is examined to check the corresponding final determination flag value, to determine whether the designated receiving apparatus is a telephone or not. If the receiving apparatus is a telephone (final determination flag=1), the process proceeds to step S84, while proceeds to step S88 if the receiving apparatus is not a telephone (final determination flag=0).

In step S84, the display 42 displays message "CALLED PARTY IS A TELEPHONE", the party's single-touch key dialing number or abbreviated dialing number and the party's telephone number. In step S86, whether the operator has pressed the start key 48 within a predetermined time period after the notification by the display 42 or not is checked. If YES, that means the operator has understood that the called party is a telephone from the display 42 and nevertheless has required automatic-calling. Accordingly, if pressing of the start key 48 is detected in step S86, automatic-calling is started in step S88.

On the other hand, if the start key 48 is not pressed within the predetermined time period, the process returns to step S64, then steps S64 to S78 are performed, and again automatic-calling request is awaited. As the process returns to step S64, the selection of automatic-calling detected in step S78 is ignored though a warning is displayed on the display 42.

In case when it is not finally determined that the called party is a telephone (NO in step S82), or in case where the start key 48 is pressed within the predetermined time period, the process proceeds to step S88 in which automatic-calling is started. That is, in step S88, the number of redialings is set to two, and in step S90, redialing interval is set to one minute.

It should be noted that the above settings are changeable.

In step S92, a telephone number is outputted onto the signal line 52d and a pulse instructing calling is outputted onto the signal line 52e, thus a call to a receiving apparatus designated from the automatic-calling circuit 20 is performed. In step S94, a signal of level "1" is outputted onto the signal line 52a to turn on the CML so that the NCU 2 connection is changed to signal lines 2a–2c (to the facsimile apparatus side). In step S95, RBT timer ($TM_1$) is set to ten seconds. In step S96, whether busy tone BT is detected on the basis of an inputted signal on the line 36a. If a BT signal is detected in step S96, the process goes to step S120 (FIG. 7), and then resets the tentative telephone flag, and then goes to step S110. The loop of steps S110 to S116→steps S92 to S96→step S120→step S110 is repeated until a redialing register value set in step S88 becomes zero (step S110).

A case where the called party is not busy will be described below. In this case, as the decision of step S96 is NO, the flow goes to S97. In step S97, whether the RBT detector 34 detects RBT is examined from a signal on the signal line 34a. If the RBT is detected, the loop of steps S97 to S98 is repeated before the RBT timer ($TM_1$) is timed-out. If the RBT is no longer detected before the RBT timer is timed-out, the process proceeds to step S97, while if the RBT time is timed-out before the RBT is no longer detected (when the RBT is detected for over ten seconds), it is judged that no response from the called party is received, and the process proceeds to step S110 in FIG. 7. The loop of steps S110 to S116→steps S92 to S96→step S98→step S110 is repeated until a redialing register value set in step S88 becomes zero (step S110).

Figure 7:
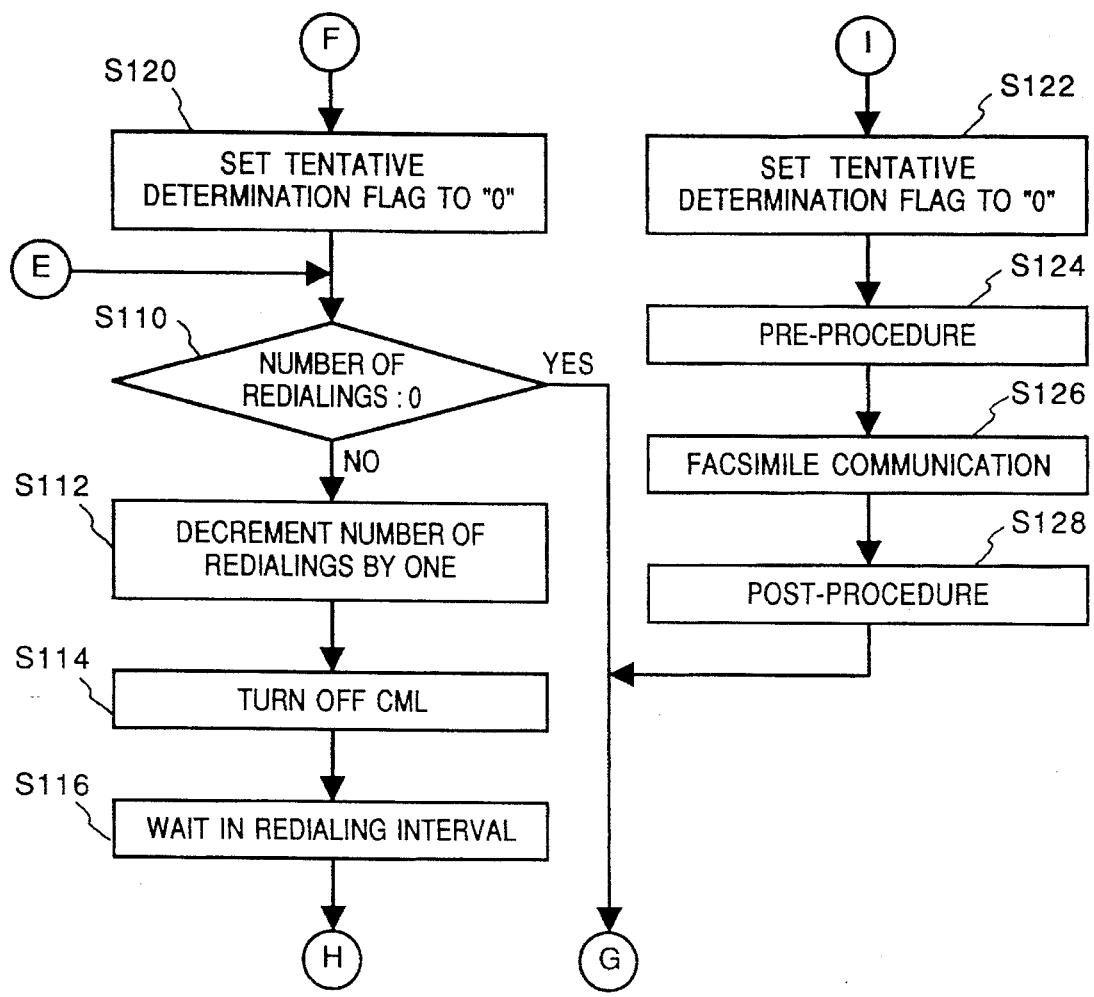

On the other hand, if the RBT is detected as off before the RBT timer is timed-out, the process proceeds to step S99 in which whether or not BT is detected is determined from a signal on the signal line 36a. That RBT has been detected as off means that a determination has become possible as to whether the called party is a normal telephone (that is, not a facsimile apparatus). For the determination, whether one of the conditions, C-1 to C-3 is met is decided in step S99. IF the called party is determined as non-telephone the process proceeds to step S120 (FIG. 7). In step S120, the tentative determination flag in the dial information memory 46 (this flag has been set to "1" in a previous automatic-calling) is reset to zero. In step S110, whether the number of redialings is zero or not is determined. If YES, the process returns to step S64 to repeat the above processings. If NO, the process proceeds to step S112 to decrement the number of redialings by one. In step S114, a signal of level "0" is outputted onto the signal line 52a to turn off the CML. Then, the process awaits for the set redialing interval in step S116, thereafter, returns to step S92 to make a call to a designated receiving apparatus again.

The determination made in step S99 will be described in detail.

C-1: Upon calling, after RBT, silent state is detected for longer than a predetermined time period.

C-2: Upon calling, after RBT, speech is detected within a predetermined time period.

C-3: Upon calling, after RBT, BT is detected within a predetermined time period (i.e., the operator of the called apparatus has picked up the hand set and then hung up.)

Figure 6:
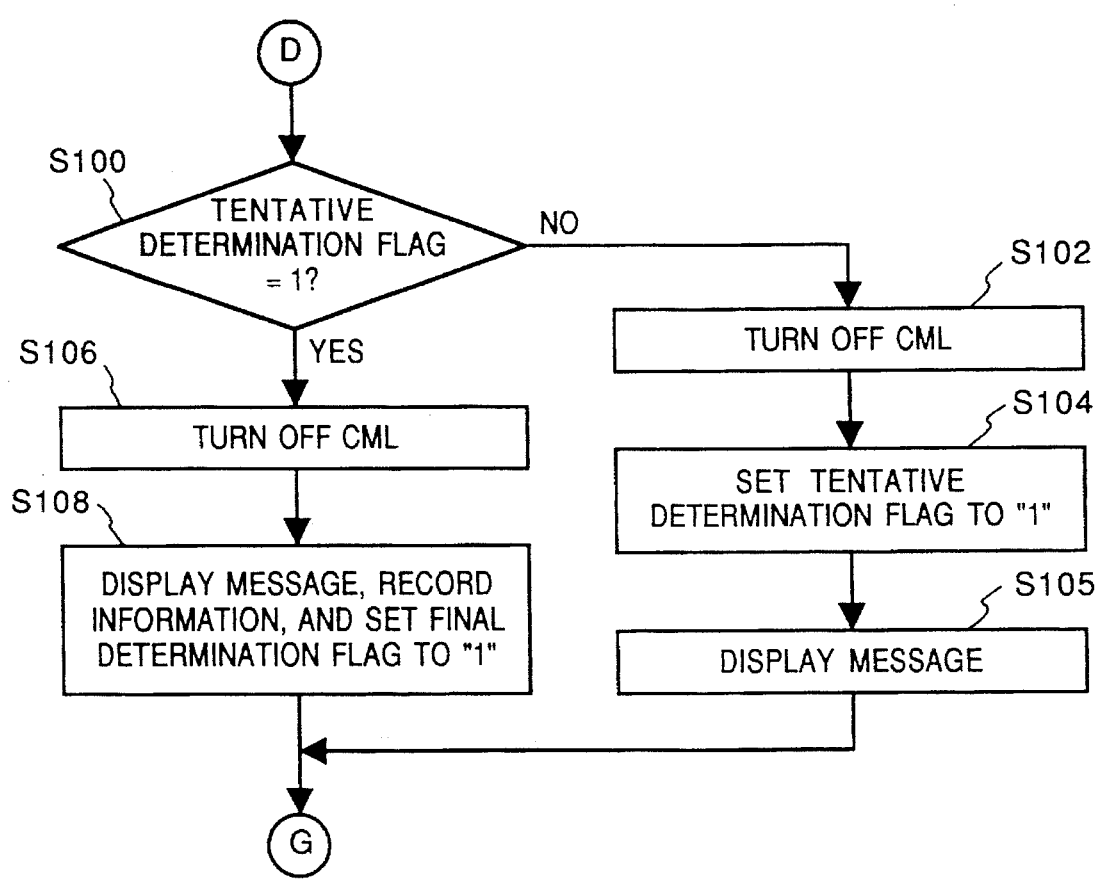

In step S99, if it is determined that the called party is a telephone, the process proceeds to step S110 (FIG. 6).

In step S100 (FIG. 6), whether the tentative determination flag corresponding to the called party is "1" or not, i.e., the result of the previous automatic-calling, is determined.

If NO, i.e., the tentative determination flag is not "1", a "0" is outputted onto the signal line 52a to turn off the CML in step S102 (the telephone and the line is connected and the connection to the facsimile apparatus is disconnected). In step S104, the tentative determination flag corresponding to the called party is set to "1" for next automatic-calling. As the process returns to step S64 via step S105, the redialing for the current automatic-calling is not performed.

On the other hand, if it is determined that the tentative determination flag is "1" (YES) in step S100, it has been determined that the called party is a telephone in the previous calling and is determined to a telephone in the current calling, i.e., the determination that the called party is a telephone is made twice. In this case, a "0" is outputted onto the signal line 52a to turn off the CML in step S106. In step S108, the following operations are performed:

a Displaying message "CALLED PARTY IS A TELEPHONE", kind of the automatic-calling (single-touch key/abbreviated dialing) and the telephone number of the called party on the display 42 for a predetermined time period.

b Recording on a report/list the determination of the called party as a telephone (mark with "★" in the embodiment) by the report/list printer 50.

c Setting the final determination flag corresponding to the called party in the dial information memory 46 to "1".

The process returns to step S64 to repeat the aforementioned processings.

It should be noted that if the called party is not a "telephone", i.e., it is a facsimile, the result in step S99 is NO and the process advances to step S122 (FIG. 7), in which the tentative determination flag corresponding to the called party is set to "0". Thereafter, facsimile transmission is performed in step S124 and the subsequent steps. More specifically, in step S124, pre-procedure including discrimination of respective functions of the called party and confirmation of the called party's receivable status is performed. In step S126, image data is transmitted, and in step S128, post-procedure including the termination of image transmission and confirmation of the termination are performed.

As described above, the facsimile apparatus with an automatic-calling function in the first embodiment has the following characteristics:

A-1 When the apparatus (transmitting side) first determines that a called party is not a facsimile apparatus (only the tentative determination flag is set from "0" to "1") after it has started automatic-calling, it terminates redialing in the automatic-calling sequence. Further, the transmitting apparatus displays or prints a notice of terminating of redialing, notice of determination that the called party is a telephone having no facsimile function and information to specify the called party. This terminating operation prevents useless redialings to the called "telephone". Moreover, the display/print-out informs the operator who started the automatic-calling that the called party is a telephone and the redialing has been terminated.

A-2 In a case where it has been determined that a called party is a telephone and redialing to the called party has been prohibited (only the tentative determination flag is "1"), but the same party is designated again, the transmitting apparatus performs the operation in A-1, i.e., prohibition of redialing and displaying message "CALLED PARTY IS A TELEPHONE" (step S108). Regarding the called party regarded as a "telephone" twice, the corresponding final determination flag is set to "1" for storing the information of this called party. (step S108).

A-3 If automatic-calling is performed to a receiving apparatus with the corresponding final determination flag being "1", i.e., if the same "telephone" is designated as a receiving apparatus more than three times, the transmitting apparatus displays message "CALLED PARTY IS A TELEPHONE" (step S84). Basically, automatic-calling to a called party regarded as a "telephone" in final determination is prohibited (step S86 back to step S64), however, even if the operator understands that the called party is a telephone but nevertheless selects automatic-calling to the called party (YES in step S86), the calling to this called party is performed. The priority of operator's decision to the device's determination improves man-machine interface operability.

A-4 If the transmitting apparatus has determined a called party is a "telephone" once but automatic-calling is selected to the same party, i.e., only the tentative determination flag is "1" and the final determination flag is "0" (NO in step S82), the automatic-calling is performed. This is because only one determination cannot be reliable in exactness.

A-5 In the report/list in steps S76 and S108, the telephone number of a called party regarded as "not a facsimile apparatus" is marked. The operator of the transmitting apparatus can easily judge the status of the receiving apparatus by referring to this list.

Modification to First Embodiment

M-1-1 In the flowchart shown in FIGS. 4 to 7, the process proceeds from step S104 to step S64, however, step S64 may be replaced with step S110. The modification enables redialing even in a case where it is determined that the called party is a telephone. In this case, if it is again determined that the called party is a telephone in the first redialing, the final determination that the called party is a telephone is made. This modification enables final determination of whether or not a called party is a telephone by one automatic-calling.

M-1-2 In the first embodiment, the determination that a called party is a telephone is made by detection of silence, speech or BT after detection of RBT. This determination conditions may be replaced with others. For example, it may be determined that the called party is a telephone only when speech is detected. In the embodiment, the condition for final determination is tentative determination that the called party is a telephone is successively made twice. However, other conditions, e.g., thrice tentative determinations, may be employed. Further, the RBT timer value may be changed. Moreover, similar control can be performed when automatic-calling is made by dialing from ten keys in place of single-touch key/abbreviated dialing.

M-1-3 The facsimile apparatus in the first embodiment can be applied to control multi-polling reception, multiple-address transmission. That is, upon calling to plural parties, there may be a telephone having no facsimile function among the called parties. To address such case, a facsimile having a "selective call" key and a "forcible call" key is proposed. These keys are provided on the operation panel 49. If automatic-call is started to plural parties including a "telephone" (final determination flag=1), the apparatus first notifies the operator that one of the parties is a "telephone" by displaying a message. If the operator presses the "selective call" key, calling to the parties except the "telephone" is performed. If the operator presses the "forcible call" key, the calling is performed to all the parties.

M-1-4 Automatic-calling function is employed in other apparatuses than a facsimile apparatus, and similar troubles caused by erroneous dialing occur in the other apparatuses. The redialing quitting control in the first embodiment can be applied to all the communication apparatuses having redialing function. Further the redialing quitting control can desirably be standardized.

Second Embodiment

In the second embodiment, the facsimile apparatus having an automatic-calling function generates an audible message to a called party of automatic-calling when it determines that the called party is not a facsimile apparatus. As the audible message, the telephone number of the transmitting apparatus, e.g., "THIS IS NUMBER 03-3123-1234", is informed.

Figure 8:
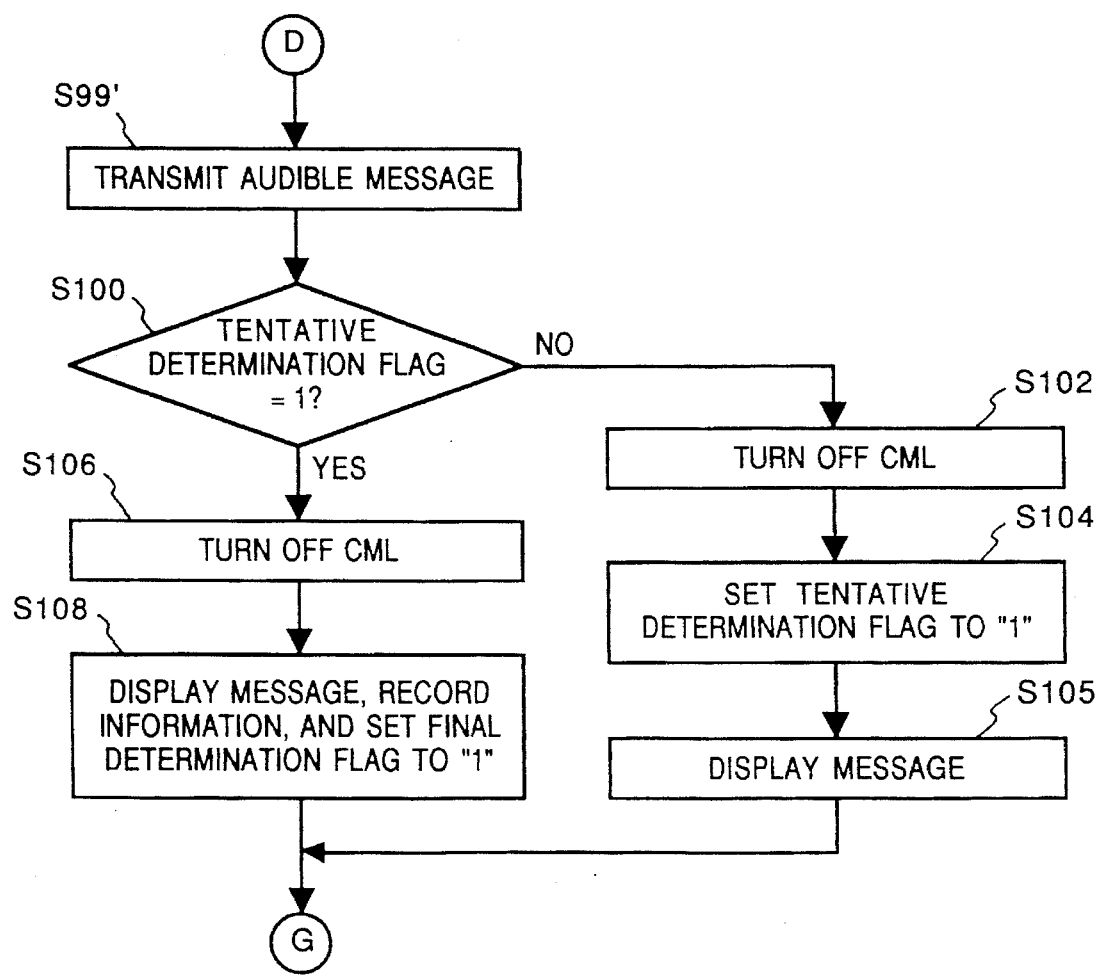
FIG. 8 is a flowchart showing a control procedure according to a second embodiment.

The construction of the facsimile apparatus according to the second embodiment is identical to that in FIGS. 1A and 1B and therefore the explanation of the construction will be omitted. Note that the apparatus in the second embodiment uses the message generator 18. The control procedure by the controller 52 in this case will be described below with reference to a flowchart of FIG. 8. In FIG. 8, step S99' is added to steps S100 to 105 in FIG. 6.

In this embodiment, if the facsimile apparatus determines that a called party is a "telephone" by detecting silence, speech or BT after detection of RBT (one of the conditions C-1 to C-3 is satisfied) in step S99, the process proceeds to step S99', in which speech information "THIS IS NUMBER 03-3123-3214" is outputted onto the signal line 52f and a pulse instructing audible message transmission is generated on the signal line 52g. Thus, the message generator 18 outputs an audible message to the called party.

As described above, the second embodiment enables a facsimile apparatus having an automatic-calling function to generate an audible message when it determines that the called party of automatic-calling is not a facsimile apparatus. The message includes the transmitting apparatus' telephone number. Accordingly, the user of the called party can recognize the telephone number of the transmitting apparatus and can inform the transmitting side operator of erroneous calling.

It should be noted that the modification in the first embodiment can be applied to the second embodiment.

Third Embodiment

The facsimile apparatus having an automatic-calling function according to the third embodiment transmits a CNG upon automatic-calling, and if it does not detect a significant signal such as a digital identification signal (DIS), a called party identification signal (CED), and a group identification signal (GI), it informs its telephone number to the called party. Note that the construction of this facsimile apparatus is identical to that of the first embodiment and therefore the explanation of the construction will be omitted.

Figure 9:
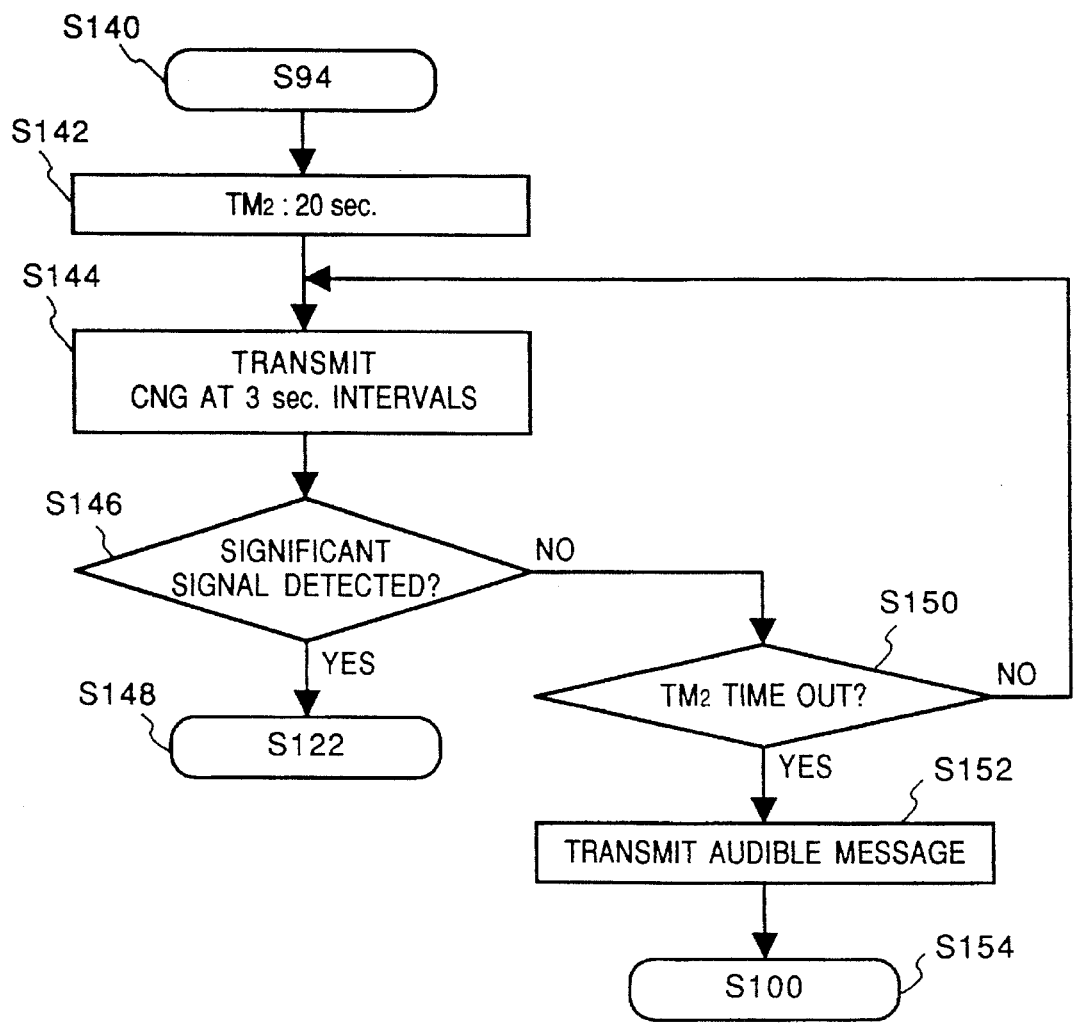
FIG. 9 is a flowchart showing a control procedure according to a third embodiment.

FIG. 9 is a flowchart showing the control procedure by the controller 52 according to the third embodiment. The flowchart of FIG. 9 shows only steps different from the first embodiment.

Figure 5:
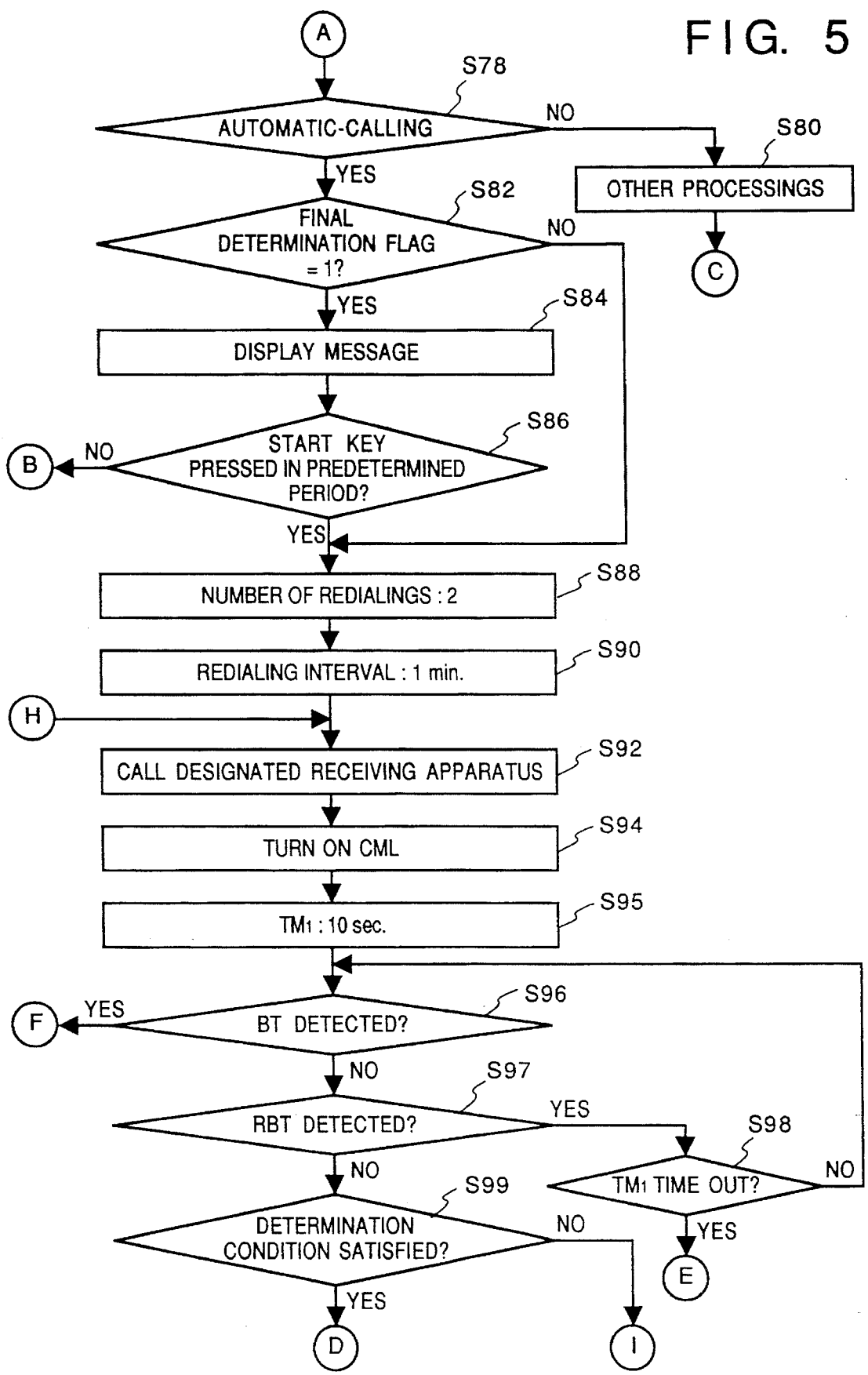

Step S140 corresponds to step S94 in FIG. 5. That is, before the process advances to step S142, automatic-calling is performed (YES in step S78 in FIG. 5), and the CML is turned on and the line is connected to the facsimile apparatus in step S94.

In step S142, timer $TM_2$ is set to twenty seconds. Next, in step S144, the CNG transmitter 16 transmits a CNG at three-second intervals. In step S146, whether a facsimile significant signal is detected or not is determined from a signal on the signal line 24a outputted from the demodulator 24. If YES, facsimile transmission is performed in step S148 (=step S122 in the first embodiment), while if NO, the process proceeds to step S150.

In step S150, whether the timer $TM_2$ has timed out or not is determined. If NO, the process returns to step S144 to repeat the above processing. If YES, the process proceeds to step S152, in which an audible message is transmitted. More specifically, speech information "THIS IS NUMBER 03-3123-3214" is outputted onto the signal line 52f and a pulse instructing speech message transmission is generated on the signal line 52g so that the message generator 18 transmits an audible message. Thereafter, the process proceeds to step S154 (=step S100 in the first embodiment).

As described above, the third embodiment enables a facsimile apparatus having an automatic-calling function to inform its telephone number to a called party of automatic-calling if the apparatus does not detect a significant signal from the called party within a predetermined time period (twenty seconds in the embodiment). In the third embodiment, as detecting RBT and BT, speech or silence is unnecessary, operation errors which may be caused by erroneous detection of RBT, BT, speech or silence is prevented. Further, circuits for detecting respective RBT, BT, speech or silence are unnecessary, whether a called party is a telephone or not is determined and the transmitter's telephone number is transmitted to the called party with a simple construction.

Modification to Third Embodiment

It should be noted that in the flowchart of FIG. 9, a significant response to a CNG upon one calling is checked to determine whether the called party is a telephone or not. However, the determination may be made when a significant response is not received after plural callings. This modification prevents the possibility of erroneous determination that a called party is a telephone when the called facsimile apparatus is busy.

Further, the above-described modifications to the first embodiment can be applied to the third embodiment.

Fourth Embodiment

When a facsimile apparatus having an automatic-calling function according to the fourth embodiment detects a call-prohibition signal from a called party, it displays message "CALL IS PROHIBITED", records reception of a call-prohibition signal, and prohibits calling (redial operations and an automatic-calling thereafter) to the called party.

This facsimile apparatus has a construction identical to that of the first embodiment (FIGS. 1A and 1B) and therefore the explanation of the construction will be omitted. FIGS. 10 to 14 are flowcharts showing the control procedure by the controller 52 according to the fourth embodiment. For easy reference, steps in the fourth embodiment corresponding to those in the first embodiment have reference numerals added by one hundred, e.g., step S162 (=step S62) and step S200 (=step S100).

Figure 14:
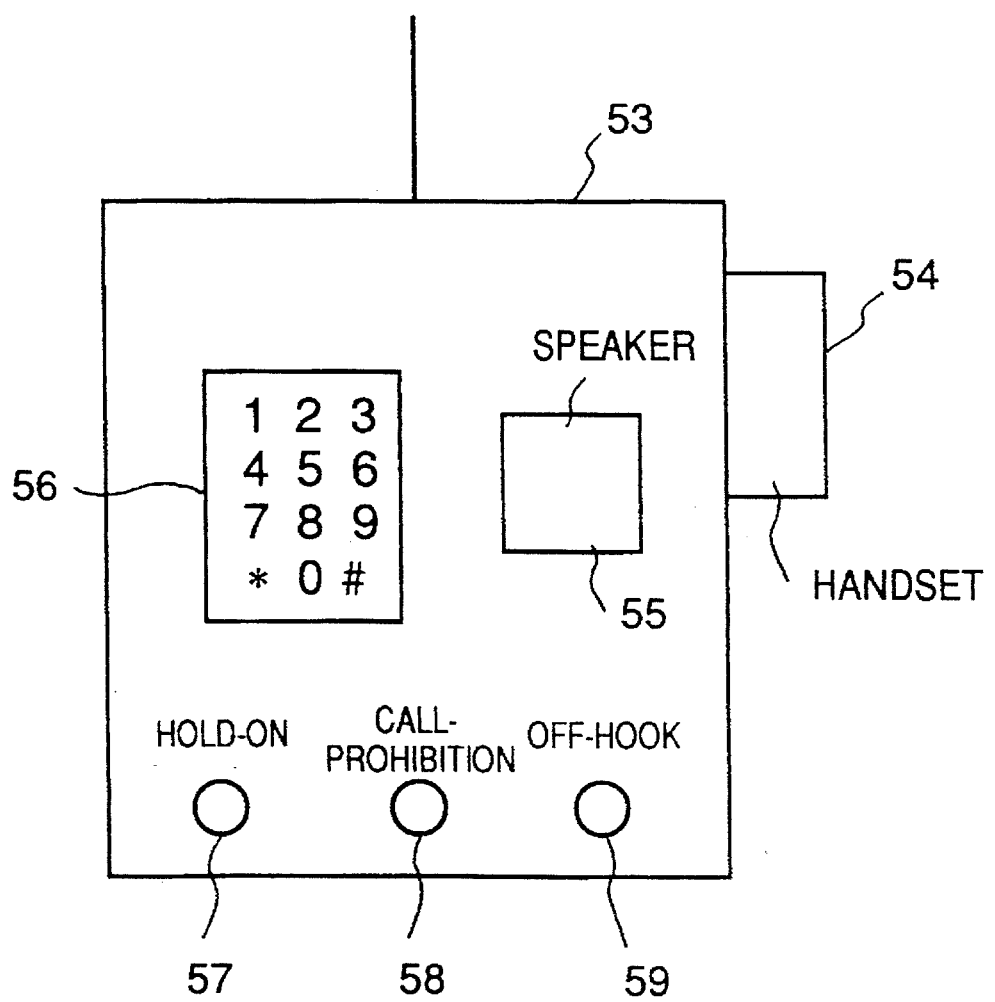
FIG. 14 is a top view of a telephone having a call-prohibition signal transmission function.

This embodiment is premised on that a called apparatus has a key switch to indicate incapability of facsimile signal reception or called apparatus' unwillingness to receive. When the user of the receiving side uses this key switch, a "call-prohibition signal" is transmitted to the transmitting apparatus. FIG. 14 shows an example of a "telephone" having this key switch. This key switch will be referred to as "call-prohibition key".

In FIG. 14, reference numeral 53 denotes a telephone; 54, a handset; 55, a speaker; 56, ten keys; 57, a hold-on key; 58, a call-prohibition key; and 59, off-hook key. When the call-prohibition key 58 is pressed, a call-prohibition signal is transmitted for a predetermined time period. This signal will prohibit redialing operations in the automatic-calling sequence in the transmitting apparatus and further prohibit calls thereafter. Note that the user of the called apparatus uses the call-prohibition key 58 after off-hook operation.

It should be noted that the call-prohibition signal transmitted from the telephone is a signal of arbitrarily-predetermined format. However, the format may preferably be standardized by the ITUT (International Telecommunication Union) in the future. For example, the format may be a combination of DTMF signals, "#*#". To detect a signal of that format by the transmitting apparatus, the aforementioned call-prohibition signal detector 32 may also have a DTMF signal detection function, and when detecting a DTMF "#*#", the detector 32 outputs a call-prohibition signal onto the signal line 32a.

In the fourth embodiment, when a call-prohibition signal is received from a called party, the single-touch key/abbreviated dialing list to be outputted includes the telephone number of the called party with a mark to indicate detection of call-prohibition signal.

Figure 4:
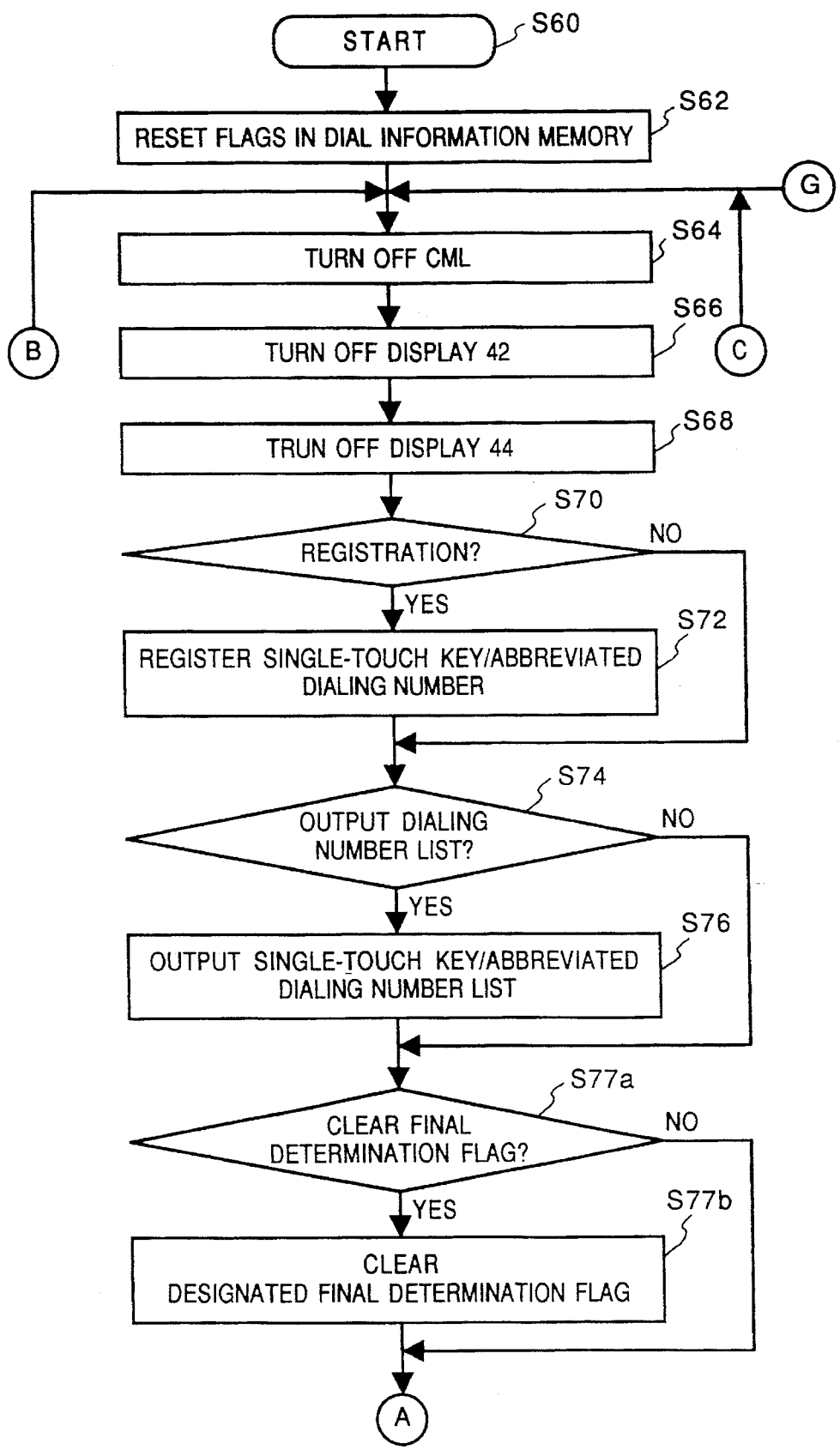
FIGS. 4 to 7 are flowcharts showing a control procedure according to the first embodiment.

The operation of the fourth embodiment will be described with reference to the flowcharts of FIGS. 10 to 13. In FIG. 10, steps S76, S77a and S77b in FIG. 4 are replaced with steps S175a to S175e.

In step S175a, the report/list printer 50 outputs a single-touch key/abbreviated dialing list (FIG. 3) based on information stored in the dial information memory 46. A called party which has been regarded as a telephone is marked with "★" in "telephone" column, and a called party which has transmitted a call-prohibition signal is marked with "★" in the "call-prohibition" column.

In steps S175b and S175c, if the operator presses the final determination flag clearing key, the final determination flag is cleared. In steps S175c and 175e, if the operator presses the negation flag clearing key, the corresponding negation flag is cleared. It should be noted that usage of this negation flag will be described in the fifth embodiment.

Figure 11A:
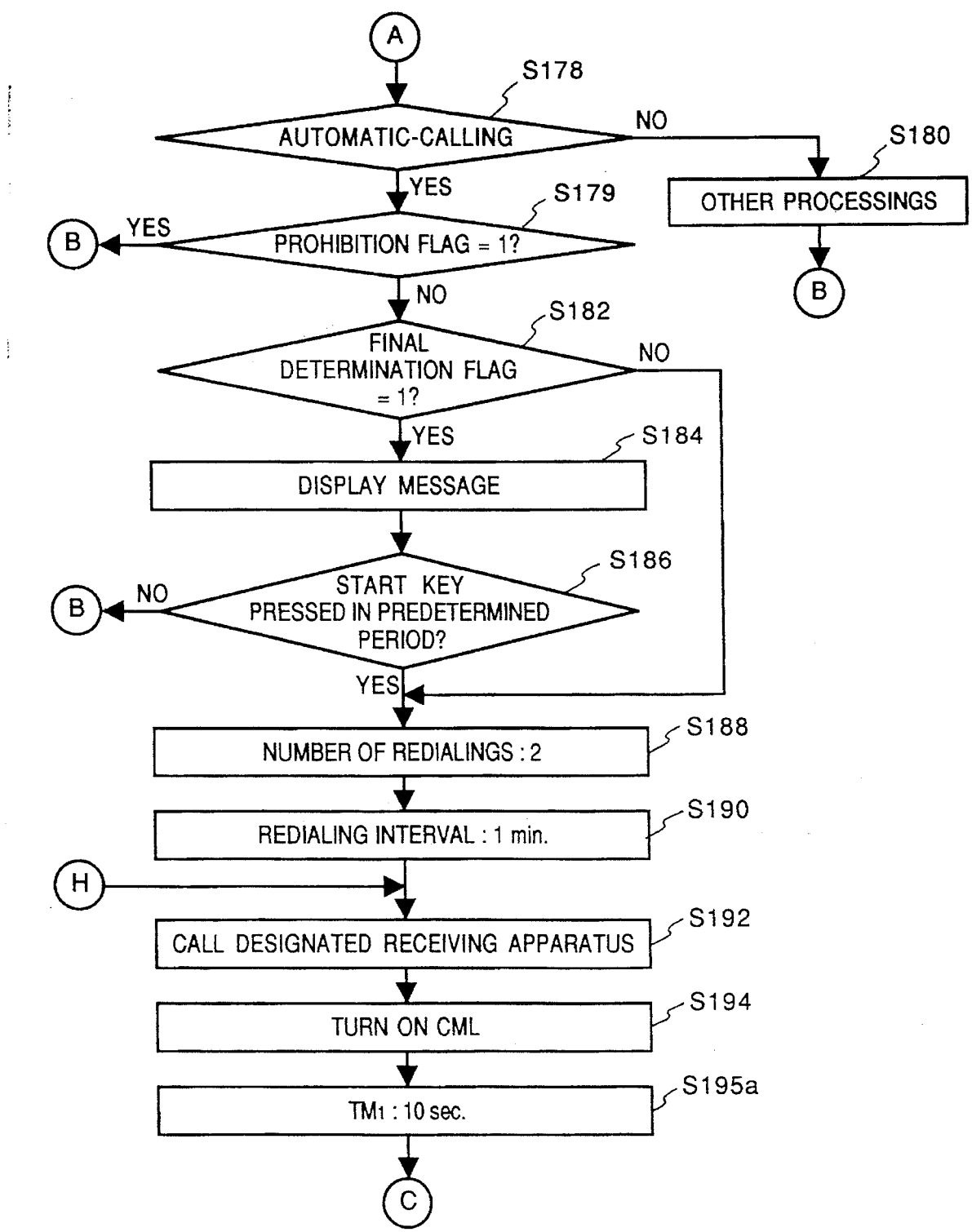
Figure 11B:
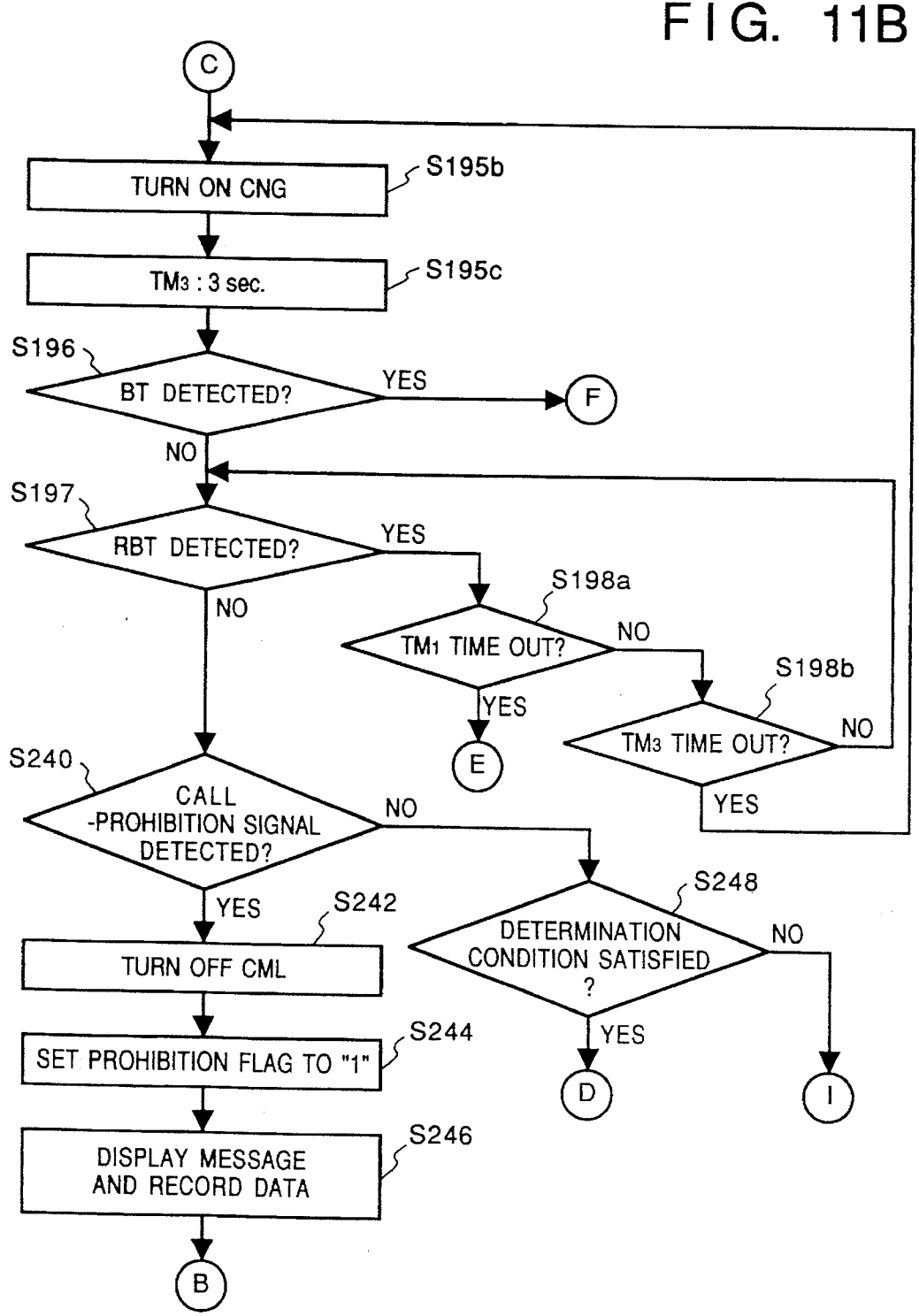

FIGS. 11A and 11B to 13 show the procedure when automatic-calling is started by the operator of the facsimile apparatus in the fourth embodiment. Steps in the fourth embodiment corresponding to those in the first embodiment have reference numerals added by one hundred, e.g., step S178 (=step S78). In FIGS. 11A and 11B, step S179 is added to the flowchart of FIG. 5 and step S99 is deleted from the flowchart of FIG. 5, further, steps S195b, S195c, S1948b, S240 to S248 are added to the flowchart of FIG. 5. The control in step S99 is performed in step S248 in FIG. 11B.

First, normal facsimile—facsimile communication, i.e., automatic-calling to a facsimile apparatus will be described.

As the receiving apparatus is a facsimile apparatus, in FIG. 2, none of the prohibition flag, the tentative determination flag and the final determination flag is set to "1". Accordingly, the control advances through steps S178→S179→S182→S188 to S192 to perform automatic-calling.

In step S194, the CML is turned on, and in step S195b (FIG. 11B), the CNG is turned on. In step S195c, the timer $TM_2$ is set to three seconds. In step S196, it is confirmed that the called party is not busy, and in step S197, it is confirmed that the BT is no longer detected. Note that meaning of the transmission of the CNG in step S195b will be apparent later.

The control advances to step S240 in which whether or not a call-prohibition signal is received from the called party is checked. If NO, the control proceeds from step S240 to S248, in which whether the called party is a "telephone" or not is determined. If NO, facsimile communication is performed from step S222 (FIG. 13) and the subsequent steps.

Figure 15:
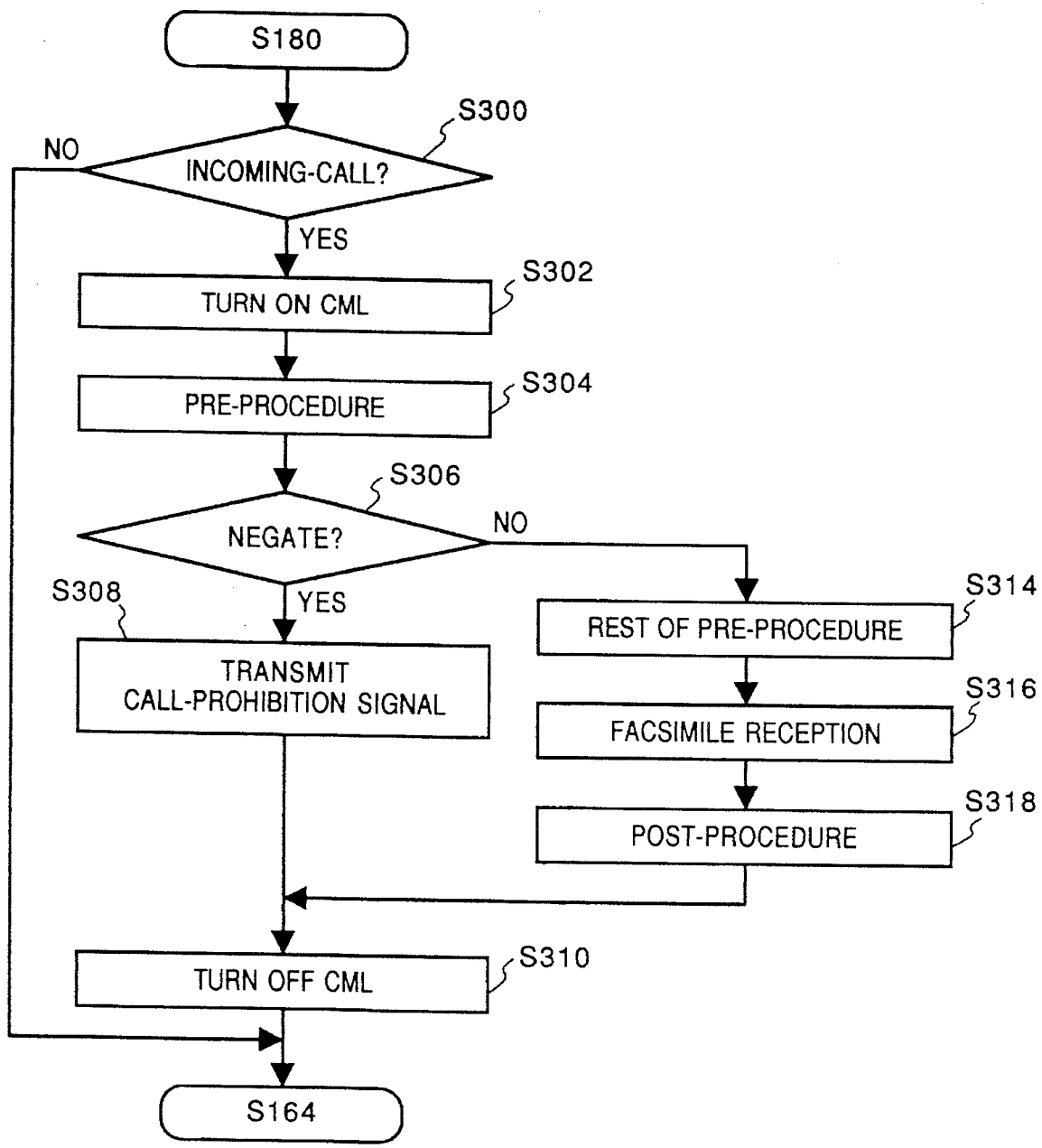
FIG. 15 is a flowchart showing a control procedure according to a fifth embodiment.

Next, the operation of the facsimile apparatus when it performs automatic-calling to a "telephone" as shown in FIG. 15 will be described below.

As this automatic-calling is made first, the corresponding "prohibition flag" and "final determination flag" are not set to "1" The control advances steps S187→S179→S182→S188 to S195c. At this time, the called party emits ringing tone. When the user of the called party picks up the handset 54, the user will hear CNG sound. If the user cannot understand the meaning of CNG sound, the user will speak, e.g., "Hello" instead of pressing the call-prohibition key 58.

The control of the call-originator apparatus advances steps S196→S197→S240. In step S240, whether a call-prohibition signal is detected or not is determined from a signal on the signal line 32a. Since the user of the called party has not pressed the call-prohibition key 58, the control proceeds to step S248.

In step S248, whether the called party is a telephone or not is determined by checking whether or not any of the aforementioned conditions C-1 to C-3 is satisfied. If the user has said "Hello", the condition C-2 is satisfied. In this case, the control proceeds to step S200 (FIG. 12) to examine the tentative determination flag. As it is "0" at this time, steps S202 to S05 are performed. That is, the tentative determination flag is set to "1", and message "CALLED PARTY IS A TELEPHONE" is displayed on the display 42. Then the control returns to step S64, so that redialing is not performed.

The user of the transmitting apparatus knows that the called party is a telephone from the message on the display 42.

Figure 12:
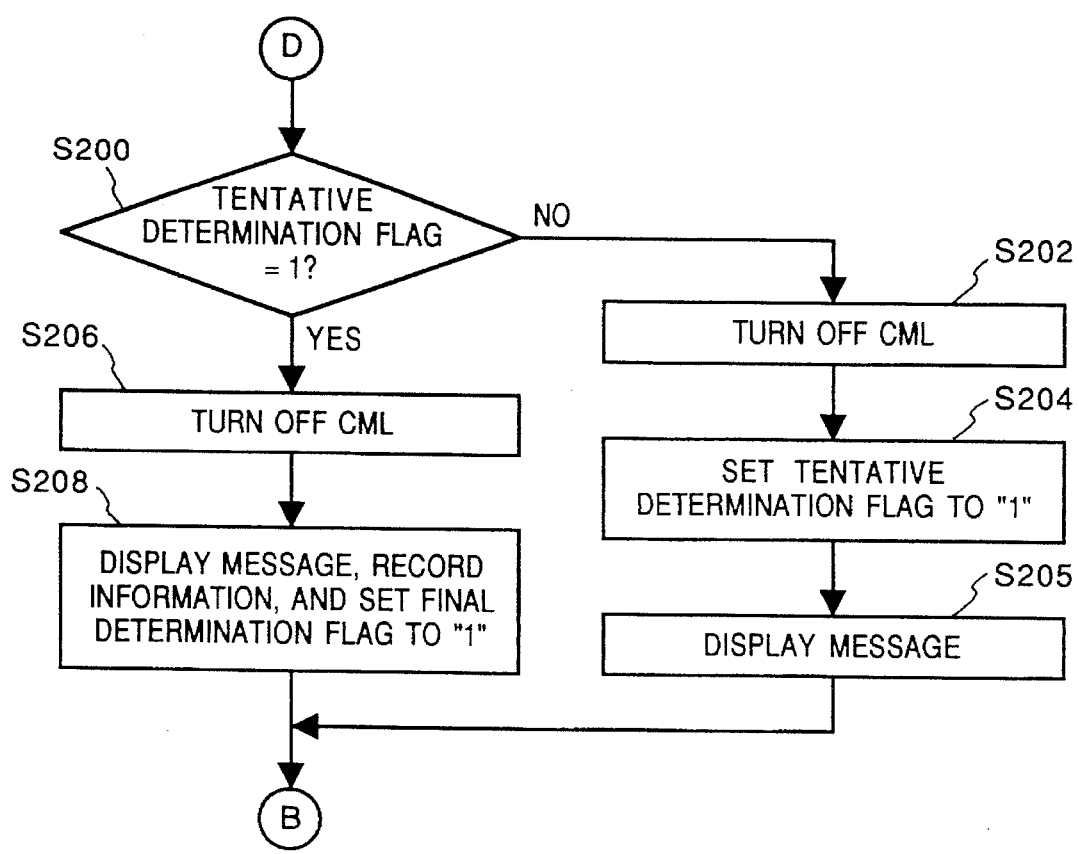
Figure 13:
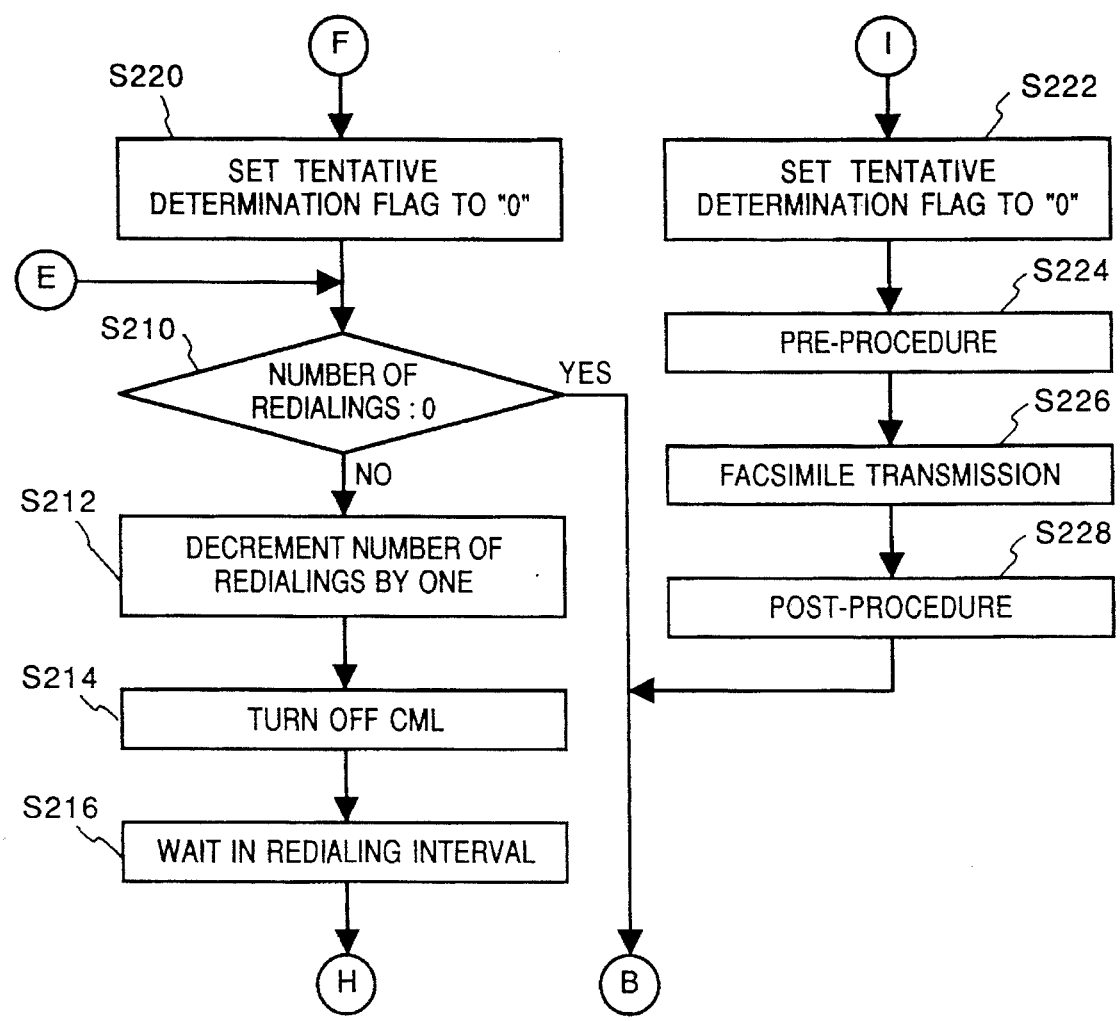

In case the user of the transmitting apparatus tries automatic-calling to the same called party, the same determination that the called party is a telephone is made in step S248 (FIG. 11B). As this determination is made twice, the control advances to step S200 (FIG. 12). As the tentative determination flag is set to "1" at this time, the CML is turned off in step S206, and the final determination flag is set to "1" in step S208.

As described above, in the fourth embodiment, the apparatus quits redialing to a receiving apparatus which has no facsimile function, and notifies the user that the called party is a telephone. Furthermore, if the same called party is designated as a receiving apparatus again, the transmitting apparatus turns on the final determination flag (step S208) to display message "CALLED PARTY IS A TELEPHONE" (step S184) regarding automatic-callings over three times. Thus, the facsimile apparatus according to the fourth embodiment has all the features in the first embodiment.

Next, the operation of the apparatus when the user of the called "telephone" presses the call-prohibition key 58 will be described. Hearing the CNG from the transmitting side (step S195b), the user of the called party can judge that the transmitting apparatus is a facsimile. The called party can prohibit redialing and automatic-calling thereafter from the transmitting apparatus by pressing the call-prohibition key 58.

More specifically, when the called party uses the call-prohibition key 58 to response to the CNG from the transmitting facsimile apparatus, the response is detected in step S240 on the transmitting side. The control advances to step S242, in which a signal of level "0" is outputted onto the signal line 52a to turn the CML off. In step S244, the corresponding prohibition flag in the dial information memory 46 is set to "1".

In step S246, message "CALL IS PROHIBITED", the type of the automatic-calling (single-touch key/abbreviated dialing), the telephone number are displayed on the display 44 for a predetermined time period. At the same time, the report/list printer 50 performs recording. Thereafter, the control returns to step S164 (FIG. 10). In this manner, when the call-prohibition key 58 is pressed on the called party side, redialing is prohibited.

Once the prohibit ion flag is set to "1", the subsequent automatic-calling to the called party is prohibited. That is, the corresponding prohibit ion flag is checked to determine whether the calling to the designated party is prohibited or not in step S179 (FIG. 11A). If YES, the control advances to step S164 and the subsequent automatic-calling is not performed.

In step S195c, the timer TM₃ is set to three seconds and in step S198b time-out is confirmed so as to keep the CNG on till the RBT is no more detected.

As described above, the fourth embodiment enables a facsimile apparatus to receive a call-prohibition signal from a called party and prohibit calling to the called party. That is, the transmitting side can recognize the called side's negation, and based on the recognition, the transmitting apparatus can prohibit redialing and automatic-calling to the same party in the automatic-calling sequence.

Modification to Fourth Embodiment

The facsimile apparatus in the fourth embodiment can be modified in various ways as follows.

The all modifications proposed in the first embodiment can be applied to the fourth embodiment. Especially, if the modification M-1-4 is applied to this embodiment, i.e., in a case where a called party has negated automatic-calling and the corresponding prohibition flag has been set to "1" but the same party is included in plural communication apparatuses as receiving parties of multiple transmission, if the selective call key is pressed, the automatic-call is performed to the parties except the call-negating party.

Fifth Embodiment

The facsimile apparatus in the fourth embodiment has redialing-prohibition function in accordance with reception of a call-prohibition signal from a called party. The facsimile apparatus according to the fifth embodiment has the following function as well as the functions of the fourth embodiment:

F5 Negating reception from a designated/undesignated transmitting apparatus. For example, the receiving apparatus in this embodiment can negate a facsimile message transmitted in the form of direct mail.

In the fifth embodiment, when reception from one call-originator is to be negated, the call-originator is registered in the table in FIG. 2. Generally, upon reception of facsimile communication, the telephone number of the transmitting apparatus is printed on a recording sheet. The telephone number on the recording sheet can be used in registration. The negation flag corresponding to the registered call-originator is set to "1". In FIG. 2, the apparatus of abbreviated dialing number "*01" is the object of negation.

However, the above registration is made after at least several troublesome receptions. For this reason, the fifth embodiment provides a mode for permitting reception from only parties registered as receiving parties of automatic-calling and negating reception from non-registered parties (hereinafter referred to as "negation mode"). The negation mode is set by pressing the aforementioned negation mode setting key of the operation panel 49. In normal facsimile communication, a call-originator who performs transmission frequently is usually registered as the receiving apparatus of automatic-calling with a single-touch key/abbreviated dialing number. For this reason, it is not inconvenient to negate reception from a non-registered party by the negation mode. Note that the negation mode is released by pressing the negation mode setting key twice.

FIG. 15 is a flowchart showing the control procedure according to the fifth embodiment. As the function F5 can be applied to the facsimile apparatus in the fourth embodiment, the flowchart in FIG. 15 is added to the control procedure in the fourth embodiment (FIGS. 11A to 14).

When the facsimile apparatus according to the fourth embodiment is idle, the control proceeds from step S180 in FIG. 11A to step S300 in FIG. 15, in which whether or not there is an incoming call is examined. If NO, the control returns to step S164.

If YES, the reception sequence is started. That is, in step S302, CML is turned on. In step S304, pre-procedure of the reception sequence is performed and a TSI indicative of the call-originating apparatus is received.

In step S306, whether reception from the call-originating apparatus designated by the TSI is negated or not is determined. The determination is made by comparing the TSI and registered numbers and checking whether the corresponding negation mode is set to "1" or not. If the negation mode is set to "1", negation is determined regarding reception from:

a: a call-originator whose corresponding negation flag is set to "1" in FIG. 2 b: a call-originator which is not registered as a receiving apparatus of automatic-calling in FIG. 2

If the negation mode is not set to "1", negation is determined regarding reception from only a call-originator the negation flag of which is set to "1" (a).

If the negation flag of the call-originator is set to "1" (a) or the call-originator is not registered as a receiving apparatus of automatic-calling (b), a call-prohibition signal is transmitted in step S308. Note that the call-prohibition signal has the same format as that of the call-prohibition signal from a telephone as shown in FIG. 14. In step S310, the CML is turned off.

If the call-originator is registered as a receiving apparatus of automatic-calling, the control proceeds to step S314 to perform the rest of the pre-procedure. In steps S316 and S318, facsimile reception is performed.

As described above, when a called party is a telephone and redialing to the party will cause troubles, the facsimile apparatus according to the embodiments enables:

1) Terminating redialing and notifying the user of erroneous dialing.

2) Informing its telephone number to the called party so that the called side can inform the transmitting side of the erroneous dialing.

3) In accordance with the called party's instruction, prohibiting automatic-calling to the called party.

4) In the called party, prohibiting reception from the transmitting apparatus.

Thus, wasteful and troublesome redialings to the called party can be prevented. As facsimile apparatus is being popularized in home life and product number is increasing, redialing by erroneous dialing will be a big problem. The facsimile apparatus in the embodiments effectively prevents such problem. Preferably, the call-prohibition signal may be standardized by, e.g., the ITUT.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A data communication apparatus for performing calling to a designated party, comprising:

designating means for designating a receiving party;

calling means for performing calling to the receiving party designated by said designating means;

reception means for receiving a call-prohibition signal transmitted from the receiving party, the call-prohibition signal being a dual tone multiple frequency signal transmitted from a telephone terminal of the receiving party: and being indicative of requiring prohibition of further calls to the receiving party;

prohibition means for prohibiting calling to the receiving party in response to the call-prohibition signal received by the reception means; and facsimile communication means for communicating a facsimile signal to a facsimile apparatus when the call-prohibition signal is not detected.

2. The apparatus according to claim 1, wherein said calling means has redialing means for performing redialing to the receiving party when a connection sequence initiated by said calling means fails.

3. The apparatus according to claim 1, further comprising output means for displaying on a display or printing on a printer the fact that redialing by said prohibition means is prohibited.

4. A communication apparatus for performing calling to designated receiving parties, comprising:

reception means for receiving a call-prohibition signal transmitted from a first receiving party, said signal being a dual tone multiple frequency signal and being indicative of requiring prohibition of further calls to the first receiving party;

memory means for storing information of the first receiving party with a mark indicative of prohibition of calling to the first receiving party, in response to the call-prohibition signal received by said reception means;

designating means for designating a second receiving party;

calling means for performing calling to the second receiving party designated by said designating means;

prohibition means for prohibiting calling to the second receiving party, if information of the second receiving party is marked to indicate the prohibition of calling to the second receiving party in said memory means; and means operatively connected to said calling means and reception means for performing a facsimile communication.

5. The apparatus according to claim 4, wherein said designating means designates a plurality of receiving parties at one time, said memory means has a table for registering dialing numbers and information indicative of whether or not calling is prohibited regarding the plurality of receiving parties designated by said designating means, and wherein said prohibition means searches the table when the plurality of receiving parties are designated by said designating means, and controls said calling means to start calling only to parties corresponding to information without mark indicating call prohibition in the table.

6. A data communication control method for performing calling to a designated party, comprising the steps:

designating a receiving party;

calling to the designated receiving party;

detecting a call-prohibition signal transmitted from the receiving party, said call-prohibition signal being a dual tone multiple frequency signal transmitted from a telephone terminal of the designated receiving party, and being indicative of requiring prohibition of further calls to the designated receiving party;

prohibiting calling to the receiving party in response to the call-prohibition signal detected in said detecting step; and performing a facsimile communication when the call-prohibition signal is not detected in said detecting step.

7. The method according to claim 6, wherein said calling step has a redialing step for performing redialing to the receiving party when a connection sequence initiated by said calling means fails.

8. The method according to claim 6, further comprising the step of displaying on a display or printing on a printer the fact that redialing is prohibited in the prohibiting step.

9. The method according to claim 6, further comprising the steps of:

detecting a ring back tone signal, a busy tone signal and an audible signal transmitted from the receiving party;

determining that the receiving party cannot receive a facsimile signal based on the ring back tone signal, the busy tone signal and the audible signal; and prohibiting calling to the receiving party in accordance with the determination.

\* \* \* \* \*